US009635878B2

(12) United States Patent
Shi et al.

(10) Patent No.: US 9,635,878 B2
(45) Date of Patent: *May 2, 2017

(54) PROCESS FOR REBAUDIOSIDE D

(71) Applicant: EPC (BEIJING) NATURAL PRODUCTS CO., LTD., Beijing (CN)

(72) Inventors: Jingang Shi, Beijing (CN); Yunlong Feng, Tianjin (CN); Chenghai Zhao, Beijing (CN); Hansheng Wang, Taiyuan (CN)

(73) Assignee: EPC (BEIJING) NATURAL PRODUCTS CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,837

(22) Filed: Jul. 25, 2014

(65) Prior Publication Data

US 2014/0335254 A1 Nov. 13, 2014

Related U.S. Application Data

(63) Continuation of application No. 12/816,449, filed on Jun. 16, 2010.

(60) Provisional application No. 61/296,107, filed on Jan. 19, 2010, provisional application No. 61/266,728, filed on Dec. 4, 2009, provisional application No. 61/187,470, filed on Jun. 16, 2009.

(51) Int. Cl.
*A23L 1/236* (2006.01)
*A23L 27/00* (2016.01)
*A23L 27/30* (2016.01)

(52) U.S. Cl.
CPC ............ *A23L 1/2363* (2013.01); *A23L 27/33* (2016.08); *A23L 27/36* (2016.08); *A23L 27/84* (2016.08); *A23L 27/86* (2016.08); *A23V 2002/00* (2013.01)

(58) Field of Classification Search
CPC ........ A23L 1/236; A23L 1/2366; A23L 1/221; A23L 2/60; A23L 1/2363
USPC .................................................. 426/546, 548
See application file for complete search history.

(56) References Cited

U.S. PATENT DOCUMENTS

| 4,082,858 | A | 4/1978 | Morita et al. |
|---|---|---|---|
| 4,353,889 | A | 10/1982 | DuBois |
| 4,361,697 | A | 11/1982 | Dobberstein et al. |
| 4,612,942 | A | 9/1986 | Dobberstein et al. |
| 4,892,938 | A | 1/1990 | Giovanetto |
| 5,112,610 | A | 5/1992 | Kienle |
| 5,962,678 | A | 10/1999 | Payzant et al. |
| 5,972,120 | A | 10/1999 | Kutowy et al. |
| 6,096,870 | A | 8/2000 | Mozaffar et al. |
| 7,238,379 | B2 | 7/2007 | Lang |
| PP22,593 | P3 | 3/2012 | Garnighian |
| 8,153,563 | B2 | 4/2012 | Morgan et al. |
| 8,257,948 | B1 | 9/2012 | Markosyan |
| PP23,164 | P3 | 11/2012 | Alvarez Britos |
| 8,318,459 | B2 | 11/2012 | Markosyan |
| 2003/0138538 | A1 | 7/2003 | Kitazume et al. |
| 2003/0139610 | A1 | 7/2003 | Khare et al. |
| 2006/0083838 | A1 | 4/2006 | Jackson et al. |
| 2006/0134292 | A1 | 6/2006 | Abelyan et al. |
| 2006/0142555 | A1 | 6/2006 | Jonnala et al. |
| 2007/0003679 | A1 | 1/2007 | Shimizu et al. |
| 2007/0082103 | A1 | 4/2007 | Magomet et al. |
| 2007/0116823 | A1 | 5/2007 | Prakash et al. |
| 2007/0116835 | A1 | 5/2007 | Prakash et al. |
| 2007/0292582 | A1 | 12/2007 | Prakash et al. |
| 2008/0026111 | A1 | 1/2008 | Bellody et al. |
| 2008/0226802 | A1 | 9/2008 | Lee |
| 2008/0300402 | A1 | 12/2008 | Yang et al. |
| 2010/0099857 | A1 | 4/2010 | Evans |
| 2010/0137569 | A1 | 6/2010 | Prakash et al. |
| 2010/0316782 | A1 | 12/2010 | Shi et al. |
| 2012/0058236 | A1 | 3/2012 | Fosdick et al. |
| 2012/0090062 | P1 | 4/2012 | Alvarez Britos |
| 2012/0090063 | P1 | 4/2012 | Alvarez Britos |
| 2012/0184500 | A1 | 7/2012 | Goralczyk et al. |
| 2012/0214751 | A1 | 8/2012 | Markosyan |
| 2012/0214752 | A1 | 8/2012 | Markosyan |
| 2012/0269954 | A1 | 10/2012 | Bridges et al. |
| 2012/0282389 | A1 | 11/2012 | Purkayastha et al. |
| 2012/0301589 | A1 | 11/2012 | Markosyan |

FOREIGN PATENT DOCUMENTS

| AU | 2004/202670 | 1/2005 |
|---|---|---|
| CA | 2 185 496 | 3/1998 |
| CN | 1192447 | 9/1998 |
| CN | 1238341 | 12/1999 |
| CN | 1243835 | 2/2000 |
| CN | 101220062 | 7/2001 |
| CN | 1078217 C | 1/2002 |
| CN | 1535607 | 10/2004 |
| CN | 101062078 | 10/2007 |

(Continued)

OTHER PUBLICATIONS

Abou-Arab, et al., "Physico-chemical assessment of natural sweeteners steviosides produced from stevia rebaudiana bertoni plant", African J. Food Sci., May 2010, vol. 4, No. 5, pp. 269-281.
Brandle, et al., "Steviol glycoside biosynthesis", Phytochemistry. 2007, No. 68(14), pp. 1855-1863.
Crammer, B. and Ikan, R. "Progress in the chemistry and properties of rebaudiosides," In Developments in Sweeteners-3, T.H. Grenby (ed), Elsevier Applied Science, London, pp. 45-64 (1987).
Serajuddin, "Salt Formation to Improve Drug Solubility", Advance Drug Delivery Reviews, No. 59, 2007, pp. 603-616.
Shibata, et al. Glucosylation of Steviol and Steviol-Glucosides in Extracts from Stevia rebaudiana Bertoni, Plant Physiol. 1991, vol. 95, pp. 152-156.

(Continued)

*Primary Examiner* — Jeffrey Mornhinweg
(74) *Attorney, Agent, or Firm* — Michael Ye; Andrews Kurth Kenyon LLP

(57) ABSTRACT

The invention describes compositions that include rebaudioside D, processes to produce rebaudioside D and formulations that provide ratios of rebaudioside A to rebaudioside D to decrease the aftertaste of rebaudioside A.

7 Claims, No Drawings

(56) References Cited

FOREIGN PATENT DOCUMENTS

| | | |
|---|---|---|
| CN | 101200480 | 6/2008 |
| CN | 101330833 | 12/2008 |
| CN | 101472487 | 7/2009 |
| CN | 101662955 | 3/2010 |
| CN | 101801177 | 8/2010 |
| CN | 101854814 | 10/2010 |
| EP | 2 215 914 | 8/2010 |
| EP | 2 415 358 | 2/2012 |
| EP | 2 428 123 | 3/2012 |
| EP | 2 456 450 | 5/2012 |
| EP | 2 457 450 | 5/2012 |
| EP | 2 460 419 | 6/2012 |
| EP | 2 486 806 | 8/2012 |
| FR | 2 968 170 | 6/2012 |
| JP | 52-023100 | 2/1977 |
| JP | 52-062300 | 5/1977 |
| JP | 54-041898 | 4/1979 |
| JP | 54-041899 | 4/1979 |
| JP | 54-041900 | 4/1979 |
| JP | 55-092400 | 7/1980 |
| JP | 56-121453 | 9/1981 |
| JP | 56-121454 | 9/1981 |
| JP | 56-121455 | 9/1981 |
| JP | 57-086264 | 5/1982 |
| JP | 58-101660 | 6/1983 |
| JP | 59120073 | 11/1984 |
| JP | 62-146599 | 6/1987 |
| JP | 63-173531 | 7/1988 |
| JP | 2-261359 | 10/1990 |
| JP | 6-192283 | 7/1994 |
| JP | 7-143860 | 6/1995 |
| JP | 7-177862 | 7/1995 |
| JP | 08-000214 | 1/1996 |
| JP | 08-325156 | 10/1996 |
| JP | 11-243906 | 9/1999 |
| JP | 2002-45145 | 2/2002 |
| JP | 2002-262822 | 9/2002 |
| JP | 2004-344071 | 12/2004 |
| JP | 2012-005483 | 1/2012 |
| JP | 2012-090629 | 5/2012 |
| KR | 1996-0016568 | 12/1996 |
| KR | 2004-0026747 | 4/2004 |
| WO | WO 00/49895 | 8/2000 |
| WO | WO 03/003994 | 1/2003 |
| WO | WO 03-033097 | 4/2003 |
| WO | WO 2006-038221 | 4/2006 |
| WO | WO 2006-045023 | 4/2006 |
| WO | WO 2006-072921 | 7/2006 |
| WO | WO 2006095366 | 9/2006 |
| WO | WO 2007/061810 | 5/2007 |
| WO | WO 2007/061898 A1 | 5/2007 |
| WO | WO 2008/057968 | 5/2008 |
| WO | WO 2008/091547 | 7/2008 |
| WO | 2009/086049 A2 | 7/2009 |
| WO | WO 2010/150930 | 12/2010 |
| WO | WO 2011/059954 | 5/2011 |
| WO | WO 2011/094423 | 8/2011 |
| WO | WO 2011/161027 | 12/2011 |
| WO | WO 2012/031879 | 3/2012 |
| WO | WO 2012/006742 | 5/2012 |
| WO | WO 2012/057575 | 5/2012 |
| WO | WO 2012/068457 | 5/2012 |
| WO | WO 2012/082677 | 6/2012 |
| WO | WO 2012/089861 | 7/2012 |
| WO | WO 2012/102769 | 8/2012 |
| WO | WO 2012/108894 | 8/2012 |
| WO | WO 2012/109506 | 8/2012 |
| WO | WO 2012/109585 | 8/2012 |
| WO | WO 2012/112177 | 8/2012 |
| WO | WO 2012/112180 | 8/2012 |
| WO | WO 2012/134502 | 10/2012 |
| WO | WO 2012/153339 | 11/2012 |
| WO | WO 2012/166163 | 12/2012 |
| WO | WO 2012/166164 | 12/2012 |

OTHER PUBLICATIONS

Upreti, et al. "Solubility Enhancement of Steviol Glycosides and Characterization of Their Inclusion Complex with Gamma-Cyclodextrin", Int. J. Mol. Sci. Nov. 2011, vol. 12, pp. 7259-7553.
International Search Report from related PCT Application PCT/IB2011/002636, dated Apr. 12, 2012, 3 pages.
International Search Report from PCT/US2012/029613, dated Feb. 1, 2013, 3 pages.
International Preliminary Report on Patentability from related PCT Application PCT/IB2011/002636, dated Feb. 26, 2013, 5 pages.
International Search Report from PCT/US2008/000700, mailed Jul. 31, 2008, 5 pages.
International Search Report from PCT/IB2010/003045, mailed May 5, 2011, 4 pages.
International Search Report and Written Opinion from PCT/IB2011/003351, dated Jul. 26, 2012, 5 pages.
International Search Report and Written Opinion from PCT/IB2010/001636, dated Dec. 2, 2010, 4 pages.
Extended European Search Report from related PCT Application PCT/IB2010/003045, dated May 6, 2013, 5 pages.
Extended European Search Report from related European Application No. 10789086.5, dated Jun. 6, 2014, 12 pages.
A.D. Kinghorn et al., "Studies to identify, isolate, develop and test naturally occurring noncariogenic sweeteners that may be used as dietary sucrose substitutes", College of Pharmacy, University of Illinois at Chicago, Jun. 25, 1980 thru Sep. 24, 1983, pp. 1-24.
Ohtani et al., "Methods to improve the taste of the sweet principles of stevia rebaudiana", Taylor & Francis (2002), pp. 138-159.
Sharma et al., "Chemistry and in vivo profile of ent-kaurene glycosides of stevia rebaudiana bertoni—an overview", Natural Product Radiance, 8(2), 2009, pp. 181-189.
Osamu Tanaka, "Improvement of taste of natural sweetners", Pure & Appl. Chem., 69(4), 1997, pp. 675-683.
Ryoji et al., "Synthesis of sweet diterpene-glycoside of leaves of stevia: rebaudiosides-A, -D, -E and their relating glycosides as well as relationship between their sweetness and chemical structure", Journal of Chemical Society of Japan, 5, 1981, pp. 726-735.
File History of U.S. Appl. No. 12/816,449, filed Jun. 16, 2010.

PROCESS FOR REBAUDIOSIDE D

CROSS REFERENCE TO RELATED APPLICATIONS

This application is a continuation of U.S. application Ser. No. 12/816,449, filed Jun. 16, 2010, which claims benefit under 35 U.S.C. §119(e) to U.S. Ser. Nos. 61/187,470, entitled "Process For Rebaudioside D", filed Jun. 16, 2009, 61/266,728, entitled "Process For Rebaudioside D", filed Dec. 4, 2009 and 61/296,107, entitled "Process For Rebaudioside D", filed Jan. 19, 2010, the contents of which are incorporated herein by reference in their entirety for all purposes.

FIELD OF THE INVENTION

The invention relates generally to a composition derived from *stevia*. The *stevia* composition comprises an increased amount of at least 0.5% of rebaudioside D, by weight, in comparison to the amount of rebaudioside D found in naturally occurring *stevia* or other naturally occurring substances that include *stevia* components. The invention also provides a method to prepare *stevia* compositions having an increased amount of at least 0.5% by weight of rebaudioside D in comparison to the content of rebaudioside D found in naturally occurring *stevia* or other naturally occurring substances that include *stevia* components. The method includes a process to convert rebaudioside A or stevioside to rebaudioside D. The conversion can be accomplished by an elegant chemical synthesis.

BACKGROUND OF THE INVENTION

*Stevia* is a genus of about 240 species of herbs and shrubs in the sunflower family (Asteraceae), native to subtropical and tropical South America and Central America.

The species *Stevia rebaudiana* Bertoni, commonly known as sweet leaf, sugarleaf, or simply *stevia*, is widely grown for its sweet leaves. The leaves have traditionally been used as a sweetener. Steviosides and rebaudiosides are the major constituents of glycosides found in the leaves of the *stevia* plant.

*Stevia* extracts generally contain a high percentage of the glycosides of the diterpene steviol. The leaves of *stevia rebaudiana* contain 10 different steviol glycosides. Steviol glycosides are considered high intensity sweeteners (about 250-300 times that of sucrose) and have been used for several years in a number of countries as a sweetener for a range of food products. Stevioside and rebaudioside A are the principal sweetening compounds and generally accompanied by smaller amounts of other steviol glycosides. The taste quality of rebaudioside A is better than stevioside, because of increased sweetness and decreased bitterness (Phytochemistry 68, 2007, 1855-1863).

The structures and chemical abstract service registry numbers for steviol and its glycosides that are the main sweetening agents of the additive steviol glycosides are shown below:

| | Compound name | C.A.S. No. | $R_1$ | $R_2$ |
|---|---|---|---|---|
| 1 | Steviol | 471-80-7 | H | H |
| 2 | Steviolbioside | 41093-60-1 | H | β-Glc-β-Glc(2→1) |
| 3 | Stevioside | 57817-89-7 | β-Glc | β-Glc-β-Glc(2→1) |
| 4 | Rebaudioside A | 58543-16-1 | β-Glc | β-Glc-β-Glc(2→1) \| β-Glc(3→1) |
| 5 | Rebaudioside B | 58543-17-2 | H | β-Glc-β-Glc(2→1) \| β-Glc(3→1) |
| 6 | Rebaudioside C | 63550-99-2 | β-Glc | β-Glc-β-Rha(2→1) \| β-Glc(3→1) |
| 7 | Rebaudioside D | 63279-13-0 | β-Glc-β-Glc(2→1) | β-Glc-β-Glc(2→1) \| β-Glc(3→1) |
| 8 | Rebaudioside E | 63279-14-1 | β-Glc-β-Glc(2→1) | β-Glc-β-Glc(2→1) |
| 9 | Rebaudioside F | 438045-89-7 | β-Glc | β-Glc-β-Xyl(2→1) \| β-Glc(3→1) |
| 10 | Rubusoside | 63849-39-4 | β-Glc | β-Glc |
| 11 | Dulcoside A | 64432-06-0 | β-Glc | β-Glc-α-Rha(2→1) |

Steviol glycoside preparations are generally white to light yellow powders that are freely soluble in water and ethanol. The powders can be odorless or have a slight characteristic odor. Aqueous solutions are 200 to 300 times sweeter than sucrose under identical conditions. With its extracts having up to 300 times the sweetness of sugar, *stevia* has garnered attention with the rise in demand for low-carbohydrate, low-sugar food alternatives.

Medical research has also shown possible benefits of *stevia* in treating obesity and high blood pressure. Because *stevia* has a negligible effect on blood glucose, it is attractive as a natural sweetener to people on carbohydrate-controlled diets.

As a sweetener and sugar substitute, rebaudioside A has a slower onset and longer duration than that of sugar, and be deemed very close to sucrose, although some of its extracts may have a bitter or licorice-like aftertaste at high concentrations. All steviol glycosides are bitter, some in less degree and some in greater degree.

Therefore, a need exists for a sweetener that overcomes one or more of the current disadvantages noted above.

BRIEF SUMMARY OF THE INVENTION

The present invention surprisingly provides the ability to mask, decrease or eliminate bitterness in an otherwise sweet composition. In particular, compositions that contain steviol glycosides typically have a bitter aftertaste. This masking of the bitterness is by the incorporation of an increased amount, relative to the given composition, of rebaudioside D.

It has been surprisingly found that by increasing the amount of rebaudioside D present in a composition that includes rebaudioside A and/or other *stevia* components such as steviol glycosides that have an aftertaste, that an increase of greater than about 0.5% by weight of rebaudioside D overcomes, decreases, eliminates or masks the aftertaste of rebaudioside A (and/or the components of a given composition that cause an aftertaste).

Accordingly, compositions with rebaudioside D and methods to prepare rebaudioside D are provided herein.

Up until the time of the present disclosure, it had not been appreciated the rebaudioside D could overcome the aftertaste effects of steviol glycosides, such as rebaudioside A. Rebaudioside A is a major component of *stevia* extracts.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The phrase "steviol glycosides" is recognized in the art and is intended to include the major and minor constituents of *stevia*. These include, but are not limited to components of *stevia* such as Steviol, Steviolbioside, Stevioside, Rebaudioside A, Rebaudioside B, Rebaudioside C, Rebaudioside D, Rebaudioside E, Rebaudioside F, Rubusoside and Dulcoside A. Typically, *stevia* contains less than a trace amount of rebaudioside D. Typical *stevia* extracts also contain less than about 0.1% by weight of rebaudioside D. As a consequence, it is quite surprising, unappreciated, and unpredicted that rebaudioside D could overcome the aftertaste of the components of *stevia* extracts.

The phrase "steviol glycosides" is recognized in the art and is intended to include the major and minor constituents of *stevia*. These include, but are not limited to components of *stevia* such as Steviol, Steviolbioside, Stevioside, Rebaudioside A (RA), Rebaudioside B (RB), Rebaudioside C (RC), Rebaudioside D (RD), Rebaudioside E (RE), Rebaudioside F (RF), Rubusoside and Dulcoside A. Typically, *stevia* contains less than a trace amount of rebaudioside D. Typical *stevia* extracts also contain less than about 0.1% by weight of rebaudioside D (RD). As a consequence, it is quite surprising, unappreciated, and unpredicted that rebaudioside D could overcome the aftertaste of the components of *stevia* extracts.

The phrase "*stevia* containing sweetener" is intended to include any composition that is prepared from a *stevia* plant, such as a *stevia* extract. The sweetener can include one or more of the components associated with the *stevia* plant, such as those noted above. Again, *stevia* containing sweeteners contain less than about 0.1% by weight of RD.

A "*stevia* composition" as referred to herein, pertains to a *stevia* extract that includes RA and one or more steviol glycosides found in the *stevia* plant. In particular, the present invention provides *stevia* compositions that are enriched with RD in amounts that mask or alter the taste of steviol glycosides, RA in particular, such that the aftertaste associated with steviol glycosides, such as RA, is reduced, eliminated or is imperceptible by an individual tasting the composition.

The present invention provides a composition that is enriched in rebaudioside D (RD hereinafter) is provided herein. The content of RD in the composition is generally greater than about 0.5% by weight relative to the amount found in a naturally occurring *stevia* source, a *stevia* extract, a food, or a sweetener. Typical *stevia* sweeteners or extracts contain greater than 99% by weight rebaudioside A and trace amounts of remaining steviol glycosides or other components, such as cellulose and the like.

In another aspect, the composition comprises about 99.5% by weight RA and at least about 0.5% RD. It has been found that having at least about 0.5% RD in such a composition masks or eliminates the aftertaste of the RA.

A method to prepare a composition enriched in RD is also provided herein. The method includes conversion from rebaudioside A or stevioside to rebaudioside D.

After a series of studies on steviol glycosides, the researchers of the present invention have discovered that the taste sensitivity of rebaudioside D is closer to sucrose than rebaudioside A. All steviol glycosides have bitter aftertaste but it has been discovered that RD masks the bitterness and/or the licorice aftertaste. RD either decreases the aftertaste to a point that it is markedly decreased (versus a sample that is not enriched with the RD at a level of at least about 5% RD over the control sample) or to a point that it is imperceptible to the individual.

As a sweetener, sweet taste acceptance determines market value. Due to the increase in the amount of rebaudioside D present in a *stevia* composition overcomes objectionable aftertaste. Sweetness is related to taste sensitivity. The ability to provide RD on an industrial scale will provide the opportunity to use RD as a significant sugar substitute.

Due to the similar structures of steviol glycosides, rebaudioside D can be synthesized from various starting materials, like rebaudioside A, stevioside, etc.

For example, if rebaudioside A was used as starting material, the sugar group at C-13 position should not change, and a glucose at C-19 position should be added to one more glucose by glucosidic bond. As a result, the sugar group at C-19 position should become a sophorose.

In the same way, other compounds as starting material also should selectively change or protect the groups at C-13 and C-19 position in the process of synthesis.

According to the actual status of starting material, synthesis strategy and reaction sequences may be different.

Rebaudioside D can also be obtained from the *stevia* plant by recrystallization techniques. Especially, for some species of *stevia* that are enriched in RD, recrystallization can achieve a good extraction result of RD.

The researcher of this invention found the increasing the content of rebaudioside D in a food or beverage can improve the aftertaste, e.g., it is more similar to sucrose and has a less bitter aftertaste that *stevia* containing products (e.g., compositions containing steviol glycosides) without the increased amount of RD.

It has been found that generally, above about 0.5% by weight of RD, with respect to the overall weight of an RA sweetener, can bring better taste when eating or drinking. Over 1% by weight of RD, in comparison to the overall weight of a given sweetener, has already produced an impressive effect. Based on the advantages of RD, the more content of RD in use, the better taste than the current sweetener of RA (95% purity from *stevia* extract).

In one aspect, the weight percent of rebaudioside A to rebaudioside D is 99:1, 98.5:1.5, 98:2, 97.5:2.5, 97:3, 96.5:3.5, 96:4, 95.5:4.5, or 95:5 by weight in a composition. The composition can be a combination of RA and RD alone or in combination with a food product.

In another aspect, the invention provides a *stevia* composition comprising from about 98.5 to about 97.5 weight percent of rebaudioside A and from about 1.5 to about 2.5 weight percent of rebaudioside D. The composition can be a combination of RA and RD alone or in combination with a food product.

In still another aspect, the present invention provides a *stevia* composition wherein the weight percent of rebaudioside A to rebaudioside D is 98.5:1.5, 98:2 or 97.5:2.5 by weight. The composition can be a combination of RA and RD alone or in combination with a food product.

The RA/RD or RD (alone) compositions can be used in beverages, broths, and beverage preparations selected from the group comprising carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free products, optionally dispensed in open containers, cans, bottles or other packaging. Such beverages and beverage preparations can be in ready-to-drink, ready-to-cook, ready-to-mix, raw, or ingredient form and can use the RD as a sole sweetener or as a co-sweetener.

The RD can be used in foods and food preparations (e.g. sweeteners, soups, sauces, flavorings, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g. spreads), preserved (e.g. meals-ready-to-eat rations), and synthesized (e.g. gels) products. Such foods and food preparations can be in ready-to-eat, ready-to-cook, ready-to-mix, raw, or ingredient form and can use the RD as a sole sweetener or as a co-sweetener.

The RD can be used in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g. spreads), preserved (e.g. meals-ready-to-eat rations), and synthesized (e.g. gels) products. Such candies, confections, desserts, and snacks can be in ready-to-eat, ready-to-cook, ready-to-mix, raw, or ingredient form, and can use the RD as a sole sweetener or as a co-sweetener.

The RD can be used in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g. toothpaste, mouthwash, rinses, floss, toothbrushes, other implements), personal care products (e.g. soaps, shampoos, rinses, lotions, balms, salves, ointments, paper goods, perfumes, lipstick, other cosmetics), professional dentistry products in which taste or smell is a factor (e.g. liquids, chewables, inhalables, injectables, salves, resins, rinses, pads, floss, implements), medical, veterinarian, and surgical products in which taste or smell is a factor (e.g. liquids, chewables, inhalables, injectables, salves, resins, rinses, pads, floss, implements), and pharmaceutical compounding fillers, syrups, capsules, gels, and coating products.

The RD can be used in consumer goods packaging materials and containers selected from the group comprising plastic film, thermoset and thermoplastic resin, gum, foil, paper, bottle, box, ink, paint, adhesive, and packaging coating products.

The RD can be used in goods including sweeteners, co-sweeteners, coated sweetener sticks, frozen confection sticks, medicine spoons (human and veterinary uses), dental instruments, pre-sweetened disposable tableware and utensils, sachets, edible sachets, potpourris, edible potpourris, artificial flowers, edible artificial flowers, clothing, edible clothing, massage oils, and edible massage oils.

The RD can also be used with "artificial sweeteners". Artificial sweeteners are those, other than sucrose, such as cyclamates and salts thereof, sucralose, aspartame, saccharin and salts thereof, *stevia* (Truvia™), rebaudioside A, xylitol, acesulfame-K and the like. The RD masks, reduces or eliminates the aftertaste associated with the artificial sweetener, such that the taste of like that of sugar.

The following paragraphs enumerated consecutively from 1 through 19 provide for various aspects of the present invention. In one embodiment, in a first paragraph (1), the present invention provides a *stevia* composition comprising an increased amount of at least 0.5% by weight of rebaudioside D in comparison to the amount of rebaudioside D in naturally occurring *stevia*.

2. The *stevia* composition of paragraph 1, wherein aftertaste is decreased.

3. The *stevia* composition of paragraph 1, wherein aftertaste is imperceptible by an individual.

4. The *stevia* composition of paragraph 1, wherein licorice aftertaste is decreased.

5. The *stevia* composition of paragraph 1, wherein licorice aftertaste is imperceptible by an individual.

6. The *stevia* composition of paragraph 1, wherein the amount of rebaudioside D is present in an amount of at least 0.5% by weight greater than the amount of rebaudioside A.

7. The *stevia* compound of paragraph 1, wherein the amount of rebaudioside D is present in an amount sufficient to mask the taste of rebaudioside A or other rebaudiosides, steviol, steviolbioside, stevioside, rubusoside or dulcoside A present in the *stevia* composition relative to naturally occurring *stevia*, such that the taste is about the same (equal, equivalent) as sucrose.

8. The *stevia* compound of paragraph 1, wherein the amount of rebaudioside D is present in an amount sufficient to mask the licorice flavor of rebaudioside A or other rebaudiosides, steviol, steviolbioside, stevioside, rubusoside or dulcoside A present in the *stevia* composition relative to naturally occurring *stevia*, such that the taste is about the same (equal, equivalent) as sucrose.

9. A method to prepare rebaudioside D comprising the step of converting rebaudioside A (RA) or stevioside to rebaudioside D (RD).

10. The method of paragraph 9, wherein RA is treated with a base solution and then neutralized with an acidic solution to provide rebaudioside B (RB).

11. The method of paragraph 10, further comprising the step of treating RB with an acetylating agent to provide acetylated RB.

12. The method of paragraph 11, further comprising the step of treating the acetylated RB with an acetylated glycopyranosyl halide to provide glycopyranosyl acetylated RB.

13. The method of paragraph 12, further comprising the step of treating the glycopyranosyl acetylated RB under deacetylating conditions to provide RD.

14. A method to decrease or eliminate aftertaste in a sweetener, comprising the step of adding at least about 0.5% rebaudioside D by weight to the sweetener.

15. A method to decrease of eliminate aftertaste in a sweetener, comprising the step of adding a sufficient amount of rebaudioside D by weight to the sweetener.

16. A method to decrease or eliminate aftertaste in an artificially sweetened composition, comprising the step of adding at least about 0.5% rebaudioside D by weight to the composition.

17. A method to decrease of eliminate aftertaste in a an artificially sweetened composition, comprising the step of adding a sufficient amount of rebaudioside D by weight to the composition.

18. The method of any of paragraphs 14 through 17, wherein the sweetener or artificial sweetener is a *stevia* product.

19. The method of paragraph 18, wherein the *stevia* product is rebaudioside A.

20. A *stevia* composition comprising from about 99 to about 95 weight percent of rebaudioside A and from about 1 to about 5 weight percent of rebaudioside D.

21. The *stevia* composition of paragraph 20, wherein the weight percent of rebaudioside A to rebaudioside D is 99:1, 98.5:1.5, 98:2, 97.5:2.5, 97:3, 96.5:3.5, 96:4, 95.5:4.5, or 95:5 by weight.

22. A *stevia* composition comprising from about 98.5 to about 97.5 weight percent of rebaudioside A and from about 1.5 to about 2.5 weight percent of rebaudioside D.

23. The *stevia* composition of claim 20, wherein the weight percent of rebaudioside A to rebaudioside D is 98.5:1.5, 98:2 or 97.5:2.5 by weight.

24. A method to decrease or eliminate aftertaste in a sweetener, comprising the step of adding a composition of rebaudioside A and rebaudioside D as claimed in any of claims 20 through 23.

25. The method of claim 24, wherein the sweetener is selected from a cyclamates and salts thereof, sucralose, aspartame, saccharin and salts thereof, *stevia* (Truvia™), rebaudioside A, xylitol, acesulfame-K or mixtures thereof.

26. A method to sweeten a food product, comprising the step of adding a composition of rebaudioside A and rebaudioside D as claimed in any of claims 20 through 23 as measured by the Spectrum™ Descriptive Analysis Method.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Rebaudioside A as Starting Material

Rebaudioside A (RA) and rebaudioside D (RD) have the similar molecular structures, with the same group at C-13 position. At C-19 position, rebaudioside A has glucose, and RD bears sophorose (2-O-β-D-glucopyranosyl-D-Glucose). RA was converted from RA to rebaudioside B (RB):

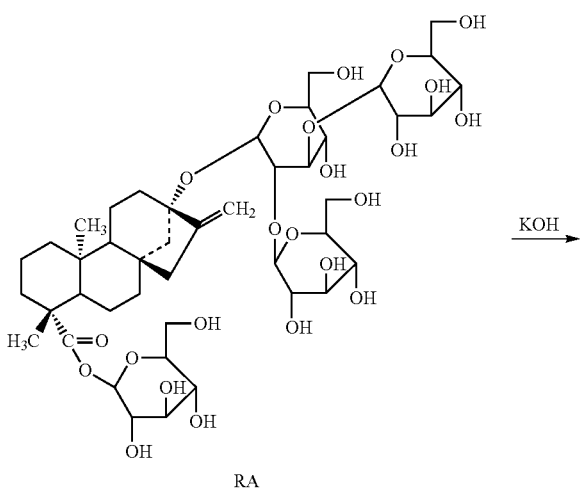

RA

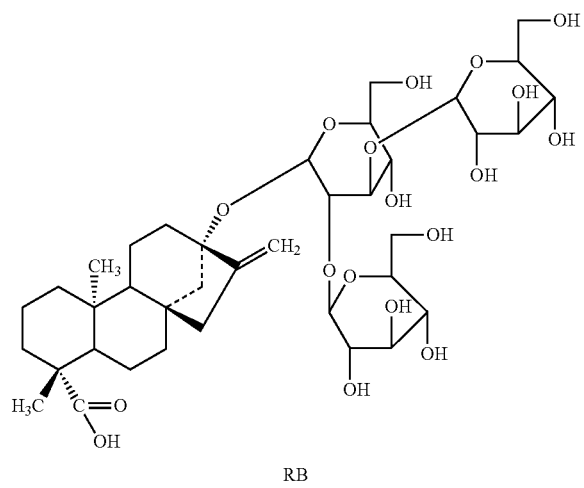

RB 9.15 g of RA (99% purity; commercial product), 200 mL of 10% KOH, and 200 mL methanol were mixed in a flask, and the resultant mixture was refluxed for 1.5 hours before cooling to 0° C. The reflux solution was adjusted to pH=3 by 10% sulfuric acid and concentrated. The residue was recrystallized with water to yield 7.5 g RB, with 99% of purity. The purity was determined by HPLC. The HPLC analysis was performed as follows: SHIMADZU 20A, Column: inertsil $NH_2$ 5 μm, 4.6×150 mm; Mobile phase:acetonitrile:water=85:15 (V/V); Flow rate: 2 ml/min; Wave length: 210 nm.

Acetylated Protection of RB:

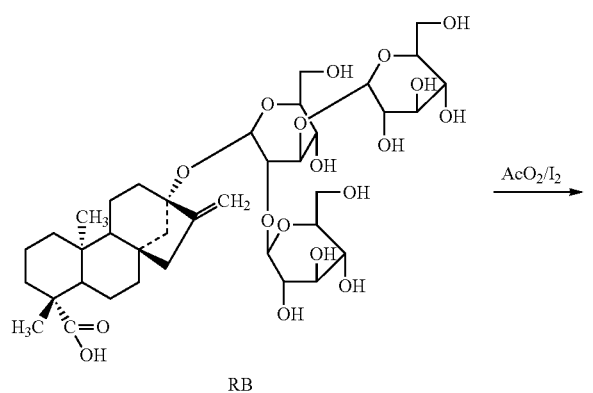

RB

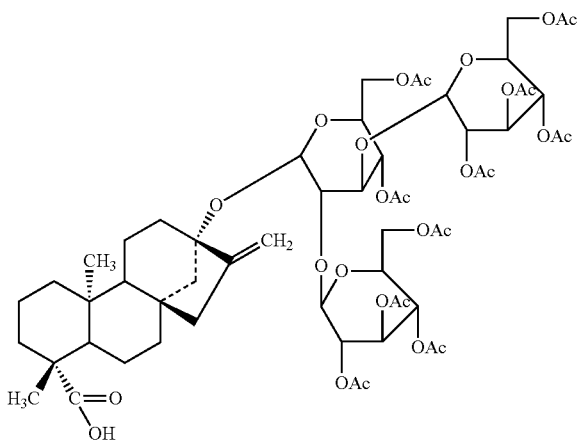

Acetylated RB 5.0 g RB was mixed with 50 mL acetic anhydride to form a suspension, and 0.2 g $I_2$ was added to the suspension with stirring. The mixture was reacted at room temperature for 5-30 min until the reaction appeared brown and transparent, which indicated the end of the acetylating reaction. The reaction mixture was diluted with 300 mL methylene dichloride (DCM), and washed in turn with ice water (120 mL×2), saturated aqueous $NaHCO_3$ (100 mL×2) and aqueous sodium thiosulfate ($Na_2S_2O_3$, 0.4 mol/L, 100 mL×2). The organic phase was dried with anhydrous sodium sulfate and then filtered. The filtrate was evaporated by rotary evaporation to afford a white solid. The white solid was recrystallized with ether and petroleum ether to yield white crystals. The yield was 87-96% by weight. The product was characterized by the HPLC conditions noted above.

Esterification and Deacetylation to Produce Rebaudioside D (RD):

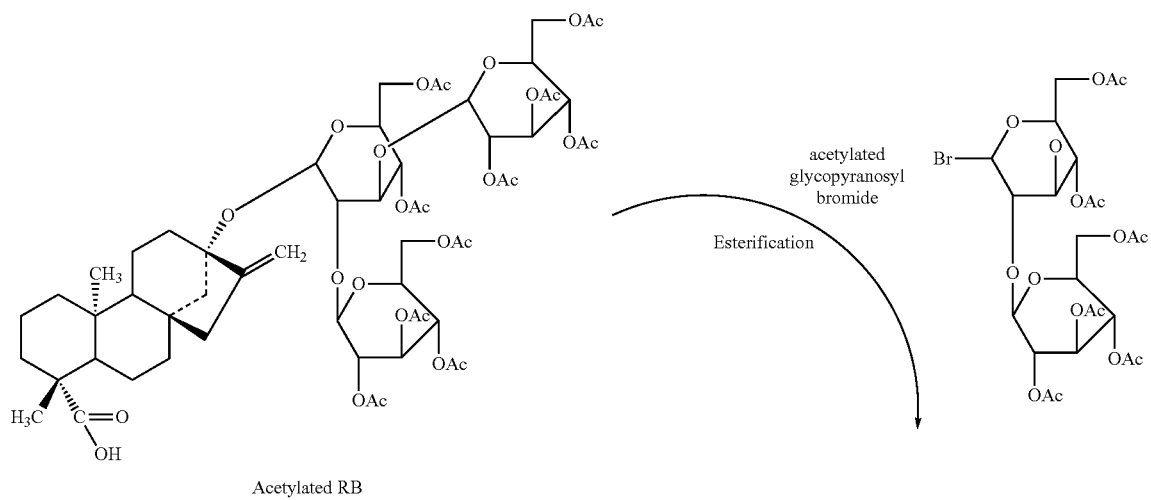

Acetylated RB

-continued

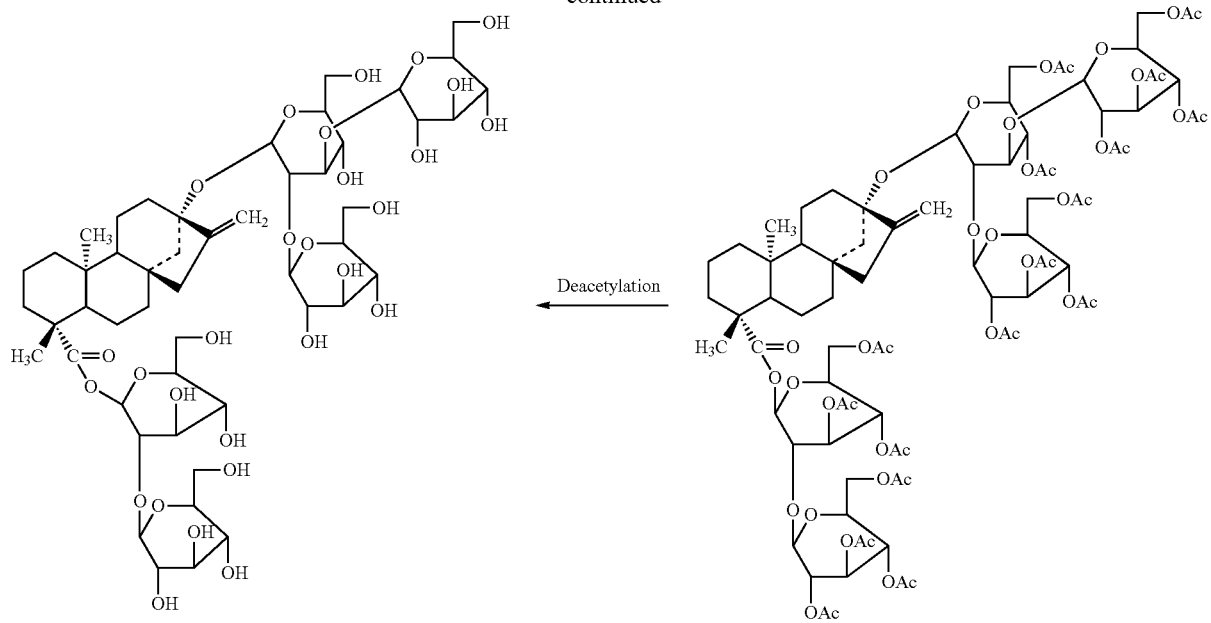

2.0 g acetylated RB was dissolved in 50 mL dichloroethane. Diatomite absorbed with silver carbonate was added to solution and then was heated to reflux. Under vigorous stirring, 3 g acetylated glycopyranosyl bromide was added in batches, and reacted at 75-80° C. for 2 hours. The reaction should avoid exposure to light. After the end of the reaction, the reaction mixture was cooled and then filtered. The filtrate was evaporated by rotary evaporator. 0.1N sodium methylate was added to the residue with stirring at room temperature for 24 hours to perform deacetylation. The resultant solution was neutralized with cation resin and then filtered. The filtrate was evaporated by rotary evaporator and the residue was dissolved in a small quantity of pyridine. Column chromatographic separation was performed by elution with chloroform:methanol:water (65:30:10). The fractions containing RD were gathered and dried. After recrystallization in water, 0.15 g white powder (RD) was produced and the yield was 8.1%.

Example 2

Stevioside as Starting Material

Following Korean Patent Application, 20040026747, β-1, 3-glucosidase was selected from *E. coli, Bacillus subtilis*, or yeast. With pachyman as donor of glucose and stevioside as substrate, in acetate buffer solution (pH=6.05), reaction mixture was kept at 50° C. for 24 hours. The resultant mixture was subjected to filtration, concentration, and recrystallization to afford RA, characterized by HPLC under conditions noted above.

According to example 1, RD was then synthesized from the RA.

Comparison of RA/RD Taste Improvement

Sample:

Rebaudioside A (RA) (purity 98%, commercial source);

RA plus rebaudioside D (RD), the ratio of RA:RD is 98:2 by weight;

RA plus RD, the ratio of RA:RD is 95:5 by weight.

Procedure:

An expert sensory panel will taste samples, and provide their impression as to the similarities of the characteristics.

The panel of assessors may be trained using the Spectrum™ Descriptive Analysis Method (Meilgaard et al, Sensory Evaluation Techniques, $3^{rd}$ edition, Chapter 11).

In order to ensure accuracy and reproducibility of results, each assessor repeated the measure of the reduction of sweetness lingering three times per sample, taking at least a five minute break between each repetition and/or sample and rinsing well with water to clear the mouth.

Generally, the method of measuring sweetness comprised taking a 10 mL aqueous (concentration at 200 ppm) sample into the mouth, holding the sample in the mouth for 5 seconds and gently swirling the sample in the mouth, rating the sweetness intensity perceived at 5 seconds, expectorating the sample (without swallowing following expectorating the sample), rinsing with one mouthful of water (e.g., vigorously moving water in mouth as if with mouth wash) and expectorating the rinse water, rating the sweetness intensity perceived immediately upon expectorating the rinse water, waiting 45 seconds and, while waiting those 45 seconds, identifying the time of maximum perceived sweetness intensity and rating the sweetness intensity at that time (moving the mouth normally and swallowing as needed), rating the sweetness intensity after another 10 seconds, rating the sweetness intensity after another 60 seconds (cumulative 120 seconds after rinse), and rating the sweetness intensity after still another 60 seconds (cumulative 180 seconds after rinse). Between samples take a 5 minute break, rinsing well with water to clear the mouth.

An improved sweet taste (sugar-like characteristic) should include maximal response, (sweetness intensity), flavor profile, temporal profile (important), mouthfeel, flavor/sweet taste interactions, and temperature effects. The assessor considered those various factors and rated the sweet taste, and then identified the best sample. All the results use statistical analysis to produce a final conclusion.

Comparison Setting:

In view of interference effect between various samples, each group only includes two samples for comparison.

Group 1: RA vs. RA/RD(98:2)
Group 2: RA/RD (98:2) vs. RA/RD (95:5)
Results:
Group 1: 9 persons of 16 assessors (56.25%) have a direct judgment that RA/RD (98:2) is better than RA.
Group 2: 6 persons of 10 assessors (60%) have a direct judgment that RA/RD (95:5) is better than RA/RD (98:2).
Conclusion:
Rebaudioside D plays an important role to improve the taste and/or mouthfeel of rebaudioside A. Generally speaking, with the increase of RD percentage in sample, the undesirable taste of RA is decreased noticeably.

Sensorical Analysis of 3 Samples Steviol-Glycosides
Test Setting:
Trained panel of 6 test persons.
Samples were prepared as 200 ppm solutions in water (same temperature).
Each test person received 3 equal glasses with 100 ml of prepared sample. The glasses were denoted with random 3-digit numbers.
The question asked was: "Can you taste a difference between the samples and if so please describe the difference in plain text".
After the tasting period, the panel exchanged the individual opinions and came to following conclusion (the nature of sample was kept hidden until the conclusion was reached):
R-A>99%: slightly less sweet than the 2 other samples, slight bitter after taste
R-A/R-D 98/2: very similar to R-A, no bitter after taste, slightly sweeter than R-A, in general "more consistent" in taste, tastes "natural"
R-A/R-D 95/5: sweeter than the 2 other samples, in the first phase of testing eventually a bit too sweet.
General remark: The 3 samples are rather similar in the sweetness profile (time of onset, length of sweet feeling, decay of intensity after several swallowing).

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A *stevia* composition comprising rebaudioside A in an amount of about 95% or greater by weight and rebaudioside D in an amount of greater than 1.1% by weight, wherein an aftertaste of rebaudioside A is decreased or eliminated by the presence of rebaudioside D.

2. The *stevia* composition of claim 1, wherein the amount of rebaudioside D is present in an amount sufficient to mask the bitter aftertaste of rebaudioside A.

3. The *stevia* composition of claim 1, wherein the amount of rebaudioside D is present in an amount sufficient to mask the licorice aftertaste of rebaudioside A.

4. A food composition comprising:
a food material; and
a *stevia* containing sweetener comprising:
rebaudioside A in an amount of about 95% or greater by weight and rebaudioside D in an amount of 1.1% or greater by weight.

5. A method to decrease or eliminate an aftertaste of rebaudioside A in a sweetener composition comprising rebaudioside A, comprising the step of adding in the sweetener composition purified rebaudioside D in an amount such that the final composition comprises rebaudioside A in an amount of about 95% or greater by weight and rebaudioside D in an amount of 1.1% or greater by weight.

6. The method of claim 5, wherein the aftertaste of rebaudioside A is metallic aftertaste.

7. The method of claim 5, wherein the aftertaste of rebaudioside A is licorice aftertaste.

* * * * *